(12) United States Patent
An et al.

(10) Patent No.: US 12,080,901 B2
(45) Date of Patent: Sep. 3, 2024

(54) BATTERY MODULE

(71) Applicant: SK Innovation Co., Ltd., Seoul (KR)

(72) Inventors: Sun Mo An, Daejeon (KR); Hae Ryong Jeon, Daejeon (KR); Young Sun Choi, Daejeon (KR)

(73) Assignee: SK ON CO., LTD., Seoul (KR)

( * ) Notice: Subject to any disclaimer, the term of this patent is extended or adjusted under 35 U.S.C. 154(b) by 121 days.

(21) Appl. No.: 17/060,237

(22) Filed: Oct. 1, 2020

(65) Prior Publication Data

US 2021/0135176 A1 May 6, 2021

(30) Foreign Application Priority Data

Nov. 1, 2019 (KR) .......................... 10-2019-0138858

(51) Int. Cl.
*H01M 50/20* (2021.01)
*H01M 10/647* (2014.01)
*H01M 10/653* (2014.01)
*H01M 10/6554* (2014.01)

(52) U.S. Cl.
CPC .......... *H01M 50/20* (2021.01); *H01M 10/647* (2015.04); *H01M 10/653* (2015.04); *H01M 10/6554* (2015.04)

(58) Field of Classification Search
CPC ............. H01M 10/647; H01M 10/653; H01M 10/6554; H01M 10/625; H01M 10/6555; H01M 10/613; H01M 10/6551; H01M 2220/20; H01M 50/20; H01M 50/211; H01M 50/224; H01M 50/249; H01M 50/271; Y02E 60/10
See application file for complete search history.

(56) References Cited

U.S. PATENT DOCUMENTS

| 2012/0028099 A1* | 2/2012 | Aoki | ................... H01M 10/643 |
| | | | 429/120 |
| 2015/0037647 A1* | 2/2015 | Nguyen | ............ H01M 10/6555 |
| | | | 429/120 |
| 2018/0040932 A1* | 2/2018 | Lee | ..................... H01M 10/625 |

(Continued)

FOREIGN PATENT DOCUMENTS

| CN | 102893449 A | 1/2013 |
| CN | 106898714 A | 6/2017 |

(Continued)

OTHER PUBLICATIONS

Office Action on the Chinese Patent Application No. 202011188112.6 issued by the Chinese Patent Office on Jun. 29, 2023.

(Continued)

*Primary Examiner* — Kiran Quraishi Akhtar
(74) *Attorney, Agent, or Firm* — IP & T GROUP LLP

(57) ABSTRACT

A battery module may include a plurality of secondary battery cells; a cell accommodating unit equipped with at least one of the secondary battery cells in a procumbent state; a cover unit coupled to the cell accommodating unit and covering an opening of the cell accommodating unit accommodating the secondary battery cells; and a heat sink unit provided in the cell accommodating unit and the cover unit and in contact with a bottom portion and a top portion of the secondary battery cells to release heat generated by the secondary battery cells externally.

6 Claims, 3 Drawing Sheets

(56) References Cited

U.S. PATENT DOCUMENTS

| | | |
|---|---|---|
| 2018/0269548 A1 | 9/2018 | Chi et al. |
| 2018/0294535 A1 | 10/2018 | Choi et al. |
| 2018/0331336 A1 | 11/2018 | Choi et al. |
| 2019/0089026 A1 | 3/2019 | Choi et al. |
| 2019/0252741 A1* | 8/2019 | Günther ............ H01M 10/6568 |
| 2020/0185672 A1 | 6/2020 | Seo et al. |

FOREIGN PATENT DOCUMENTS

| | | | |
|---|---|---|---|
| CN | 108140914 A | 6/2018 | |
| CN | 108140916 A | 6/2018 | |
| CN | 108370075 A | 8/2018 | |
| CN | 108695458 A | 10/2018 | |
| CN | 208401004 U | 1/2019 | |
| CN | 109524583 A | 3/2019 | |
| CN | 109565007 A | 4/2019 | |
| JP | 2018-503233 A | 2/2018 | |
| JP | 2019-186034 A | 10/2019 | |
| KR | 10-0870355 B1 | 11/2008 | |
| WO | WO2018/024483 | * 2/2018 | .......... H01M 10/625 |

OTHER PUBLICATIONS

Office Action for the Chinese Patent Application No. 202011188112.6 issued by the Chinese Patent Office on Jan. 25, 2024.

Rejection Decision for Chinese Patent Application No. 202011188112.6 issued by the Chinese Patent Office on May 15, 2024.

\* cited by examiner

BATTERY MODULE

CROSS-REFERENCE TO RELATED APPLICATION

This application claims priority to Korean Patent Application No. 10-2019-0138858 filed Nov. 1, 2019, the disclosure of which is hereby incorporated by reference in its entirety.

BACKGROUND

1. Field of the Invention

The present disclosure relates to a battery module.

2. Description of Related Art

With increased demand for mobile devices, electric vehicles, and the like, along with the development of related technologies, demand for a secondary battery cell as an energy source has rapidly increased. A secondary battery cell may be repeatedly charged and discharged as mutual conversion between chemical energy and electrical energy is reversible in a secondary battery.

Such a secondary battery cell includes an electrode assembly of an anode, a cathode, a separation film, and an electrolyte solution, which are the main components of a secondary battery, and a cell body member of a multilayer laminated film case for protecting the same.

However, such an electrode assembly generates heat while undergoing the process of charging and discharging, and a temperature rise due to the generated heat deteriorates performance of the secondary battery cell.

In this regard, a housing member accommodating a secondary battery cell and a heat sink in contact therewith have conventionally been suggested to cool the secondary battery cell.

There has been, however, a limitation that cooling performance may be deteriorated by the heat sink disposed on an exterior of the housing member.

In another aspect, the secondary battery cell is conventionally installed such that a bottom portion stands to be in contact with a lower plate member of the housing member, thereby making it difficult to change a height direction design.

In addition, to increase a number of secondary battery cells installed to increase an energy density, the housing member needs to be extended in a width direction, thus disabling effective space use and leading to a limitation that an additional structure is required for rigidity compensation.

Accordingly, to resolve the above limitations, research of a battery module has been conducted.

SUMMARY OF THE INVENTION

An aspect of the present disclosure is to provide a battery module having improved heat dissipating performance by a heat sink unit.

Another aspect of the present disclosure is to provide a battery module capable of obtaining a degree of freedom in height direction design changes when accommodating a secondary battery cell.

According to an example embodiment of the present disclosure, a battery module may include a plurality of secondary battery cells; a cell accommodating unit equipped with the secondary battery cells in a procumbent state; a cover unit coupled to the cell accommodating unit and covering an opening of the cell accommodating unit accommodating the secondary battery cells; and a heat sink unit provided in the cell accommodating unit and the cover unit and in contact with a bottom portion and a top portion of the secondary battery cells to release heat generated by the secondary battery cells externally.

In this case, the cell accommodating unit of the battery module according to an example embodiment may include a lower plate member in which the secondary battery cells is seated and in contact with a side surface portion of a lowermost secondary battery cell; an upper plate member disposed to face the lower plate member; and a middle plate member coupled to connect the lower plate member and the upper plate member and in contact with the bottom portion of the secondary battery cells.

Specifically, the heat sink unit of the battery module according to an example embodiment may include a center heat sink provided in the middle plate member and releasing heat generated by the bottom portion of the secondary battery cells externally.

Further, the heat sink unit of the battery module according to an example embodiment may include a side heat sink provided in a side cover member of the cell accommodating unit facing the middle plate member and releasing heat generated by the top portion of the secondary battery cells externally.

In addition, the heatsink unit of the battery module according to an example embodiment may include a cooling pin member disposed between the secondary battery cells neighboring each other and has one end portion extended to be close to the middle plate member and the other end portion in contact with the side cover member.

In this case, the cooling pin member of the battery module according to an example embodiment may include a contact plate on the other end portion, enlarging a contact surface area with the side cover member.

Further, the heat sink unit of the battery module according to an example embodiment may include a thermally conductive member disposed between the middle plate member disposed with the center heat sink, the side cover member disposed with the side heat sink and the bottom portion of the secondary battery cells, and the top portion of the secondary battery cells and forming a heat transfer path.

In this case, the thermally conductive member of the battery module according to an example embodiment may be formed in the remaining region of the top portion of the secondary battery cells, neighboring a region in which the sealing portion of the secondary battery cells formed to protrude from the top portion of the secondary battery cells is folded.

Additionally, the thermally conductive member of the battery module according to an example embodiment may have a portion in contact with the bottom portion of the secondary battery cells, formed to have a shape corresponding to a shape of the bottom portion of the secondary battery cells to support the secondary battery cells.

Further, the thermally conductive member of the battery module according to an example embodiment may be formed of at least one of silicon, polyurethane and an epoxy material, such that the secondary battery cells is bonded thereto.

The side heat sink of the battery module according to an example embodiment may be provided to extend to a support tab of the side cover member formed to protrude in a direction of the secondary battery cells such that a plurality of the secondary battery cells disposed to be stacked on the cell accommodating unit are supported.

In this case, the support tab of the battery module according to an example embodiment may be formed to have a shape corresponding to the remaining region of the top portion of the secondary battery cells neighboring a region in which the sealing portion of the secondary battery cells formed to protrude from the top portion of the secondary battery cells is folded.

Further, the cell accommodating unit of the battery module according to an example embodiment may be disposed by stacking a pouch-type secondary battery cells three-surface-sealing and accommodating an electrode assembly.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
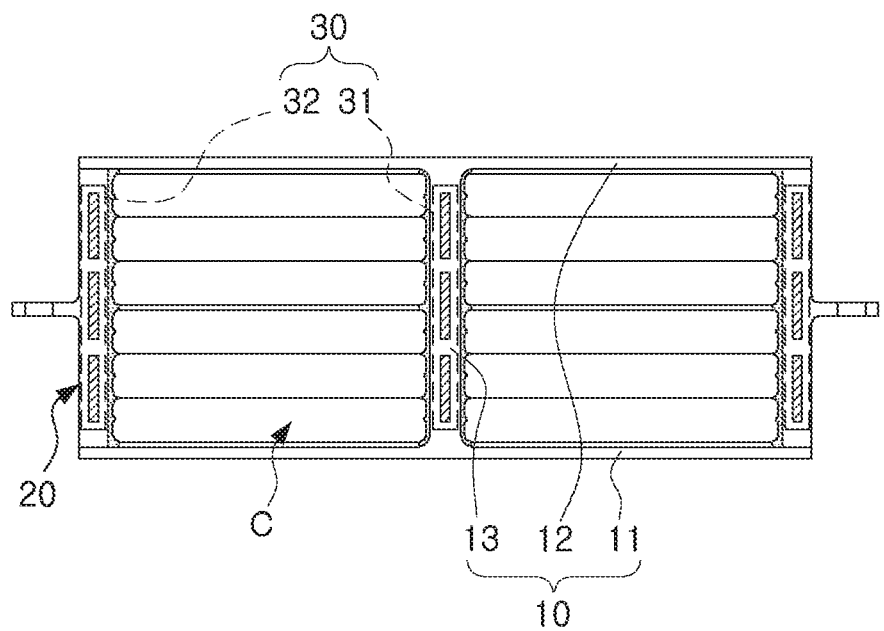
FIG. 1 is a front view of a battery module of the present disclosure.

Hereinafter, example embodiments of the present disclosure will be described with reference to the accompanying drawings. The present disclosure is not limited to example embodiments, and it is to be understood that modifications can be made without departing from the spirit and scope of the present disclosure. Shapes and sizes of the elements in the drawings may be exaggerated for clarity of description.

In addition, an expression used in the singular encompasses the expression of the plural, unless it has a clearly different meaning in context. Identical or corresponding elements will be given the same reference numerals.

The present disclosure relates to a battery module capable of having improved heat dissipating performance due to a heat sink unit 30, which enables to install a larger number of secondary battery cells C so as to increase an energy density in the battery module, and having reduced outbreak of fire caused by heat from the secondary battery cells C.

In another aspect, the battery module of the present disclosure can secure a degree of freedom in height direction design changes when accommodating the secondary battery cells C and can thus have increased efficiency in space utilization when installing the secondary battery cells C.

Further, the battery module of the present disclosure can have rigidity reinforcing effect due to a structure thereof without any additional configuration and can thus secure durability while reducing an overall weight thereof.

In this case, the secondary battery cell C may include an electrode assembly and a cell body member surrounding the electrode assembly.

The electrode assembly, together with an electrolyte substantially included therein, is accommodated in the cell body member to be used. The electrolyte may include a lithium salt, such as $LiPF_6$, $LiBF_4$, or the like, in an organic solvent, such as thylene carbonate (EC), propylene carbonate (PC), diethyl carbonate (DEC), ethylmethyl carbonate (EMC), and dimethyl carbonate (DMC). Further, the electrolyte may be a liquid, solid or gel phase.

In addition, the cell body member is an element for protecting the electrode assembly and accommodating the electrolyte. As an example, the cell body member may be provided as a pouch-type member or a can-type member. The pouch-type member is a form in which the electrode assembly is three-surface sealed to be accommodated. The pouch-type member is a member configured to fold and bond three surfaces—an upper surface and side surfaces, excluding one surface, mostly a lower surface—to seal while having the electrode assembly accommodated therein. The can-type member is in the form in which the electrode assembly is one-surface sealed to be accommodated. The can-type member is a member configured to fold and bond one surface —the upper surface excluding three surfaces, mostly the lower surface and the side surfaces—to seal while having the electrode assembly accommodated therein.

Such a pouch-type or can-type secondary battery cell C is merely an example of a secondary battery cell accommodated in the battery module of the present disclosure, and the secondary battery cell C accommodated in the battery module of the present disclosure is not limited thereto.

Figure 2:
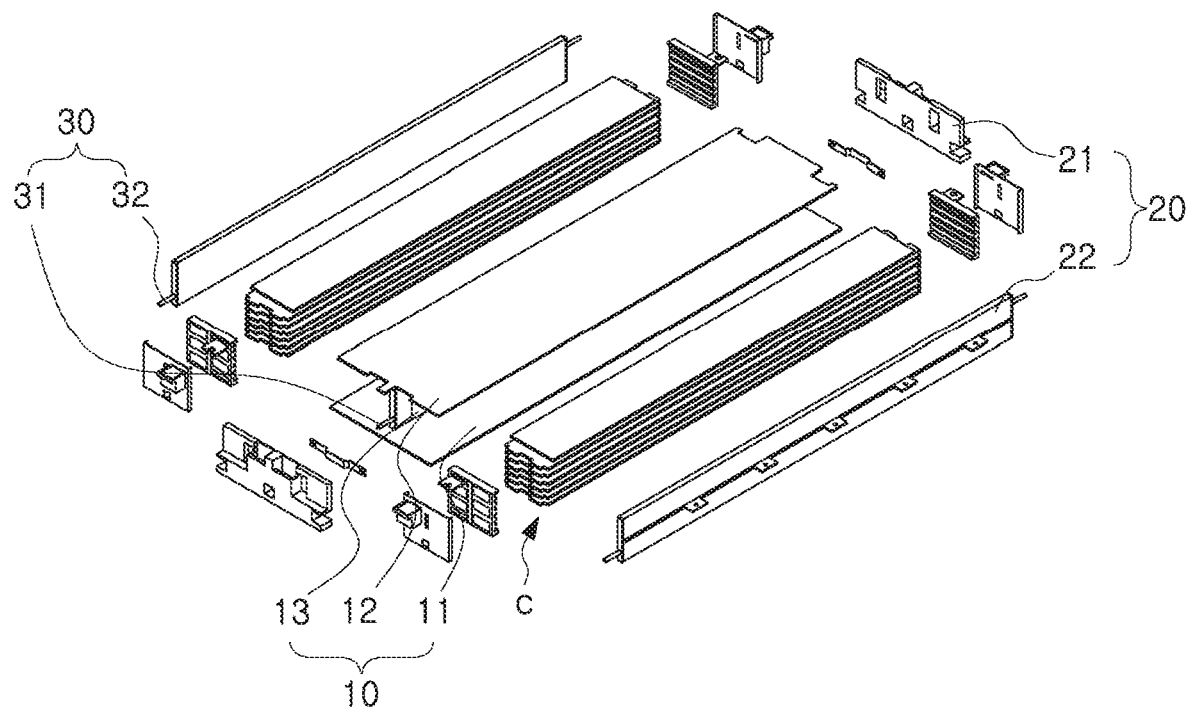
FIG. 2 is a perspective view of a disassembly of a secondary battery.

Specifically with reference to the drawings, FIG. 1 is a front view of a battery module of the present disclosure, and FIG. 2 is a perspective view of a disassembly of a secondary battery. Referring to FIGS. 1 and 2, a battery module according to an example embodiment may include a plurality of secondary battery cells C, a cell accommodating unit 10 equipped with at least one of the secondary battery cells C in a procumbent state; a cover unit 20 coupled to the cell accommodating unit 10 and covering an opening of the cell accommodating unit 10 accommodating the secondary battery cells C; and a heat sink unit 30 provided in the cell accommodating unit 10 and the cover unit 20 and in contact with a bottom portion B and a top portion T of the secondary battery cells C to release heat H delivered from the secondary battery cells C externally.

That is, in the battery module of the present disclosure, the secondary battery cells C is mounted in the cell accommodating unit 10 in a procumbent state and is provided with the heat sink unit 30 receiving heat H to the top portion T and the bottom portion B of the secondary battery cells to release the heat H externally, and can thus have improved heat dissipating performance.

In this case, the heat sink unit 30 receives heat H not limitedly to the bottom portion B of the secondary battery cells C, but also to the top portion T of the secondary battery cells, thereby having improved cooling performance due to an increased number of heat transfer paths.

Moreover, as the battery module includes the cell accommodating unit 10 in which the secondary battery cells C is mounted in a procumbent state, the secondary battery cells C may be stacked in a height direction of the cell accommodating unit 10 in the case in which a plurality of the secondary battery cells C are installed. This serves to secure a degree of freedom in height direction design changes of the cell accommodating unit 10.

The cell accommodating unit 10 is an element in which the secondary battery cells C is installed in a procumbent state. To this end, the cell accommodating unit 10 may include a lower plate member 11, an upper plate member 12 and a middle plate member 13.

That is, the cell accommodating unit 10 of the battery module according to an example embodiment may include a lower plate member 11 in which the secondary battery cells C is seated and in contact with a side surface portion S of a lowermost secondary battery cells C; a upper plate member 12 disposed to face the lower plate member 11; and a middle plate member 13 coupled to connect the lower plate member 11 and the upper plate member 12 and in contact with the bottom portion B of the secondary battery cells C.

In other words, the cell accommodating unit 10 of the present disclosure is suggesting a structure in which the side surface portion S of the lowermost secondary battery cells C is in contact with the lower plate member 11 and the bottom portion B is in contact with the middle plate member 13. As an example, in the cell accommodating unit 10, the secondary battery cells C may be configured to be inserted into a space formed by the lower plate member 11, the upper plate member 12 and the middle plate member 13 in a procumbent state. In this case, the cell accommodating unit 10 may be formed of a material such as aluminum (Al), steel (Fe), or the like.

According to the above, in the case in which a plurality of the secondary battery cells C are installed, the secondary battery cells C can be stacked in the height direction of the cell accommodating unit 10, and can thus secure a degree of freedom in height direction design changes of the cell accommodating unit 10.

The lower plate member 11 is an element disposed in a lower portion of the cell accommodating unit 10 and is seated to have the secondary battery cells in a procumbent state. The lower plate member 11 may be disposed to face the upper plate member 12 and may be bonded such that the middle plate member 13 is disposed between the upper plate member 12 and the lower plate member 11.

The lower plate member 11 may be seated to have the secondary battery cells C in a procumbent state such that the side surface portion S of the secondary battery cells C is in contact therewith. In the case in which a plurality of the secondary battery cells C are stacked, a side surface portion S of a lowermost secondary battery cell C is in contact with the lower plate member 11.

The upper plate member 12 may be disposed to face the lower plate member 11 and be in contact with the side surface portion S of the secondary battery cells C. In the case in which a plurality of the secondary battery cells C are provided, the upper plate member 12 is in contact with a side surface S of an uppermost secondary battery cell C.

A pad member is disposed between the lower plate member 11 and the secondary battery cells C and between the upper plate member 12 and the secondary battery cells C to serve to absorb a volume change due to swelling of the secondary battery cells C. Specifically, a side pad of the pad member may be disposed between the lower plate member 11 and the side surface portion S of the lowermost secondary battery cell C or between the upper plate member 12 and the side surface portion S of the uppermost secondary battery cell C.

Alternately, the side pad may be disposed between a plurality of the stacked secondary battery cells C even when not in contact with the upper plate member 12 or the lower plate member 11 to absorb a volume change due to the swelling of the secondary battery cells C.

The middle plate member 13 is an element bonding the lower plate member 11 and the upper plate member 12 and forms a space accommodating the lower plate member 11, the upper plate member 12 and the secondary battery cells C.

As an example, the middle plate member 13 of the cell accommodating unit 10 according to an example embodiment features in that the lower plate member 11 and the upper plate member 12 horizontally facing each other are vertically bonded to both end portions of the middle plate member 13.

In other words, the middle plate member 13 is vertically disposed, and the lower plate member 11 and the upper plate member 12 are parallel to each other and bonded to both end portions of the middle plate member 13.

More specifically, the middle plate member 13 is bonded to a central portion between the upper plate member 12 and the lower plate member 11 to form a "I" shape or to an edge portion of the upper plate member 12 to form a "Π" shape.

Further, the middle plate member 13 may be disposed to be in contact with the bottom portion B of the secondary battery cells C, which enables to receive heat H generated by the secondary battery cells C and to release heat H externally through the heat sink unit 30.

The cell accommodating unit 10 of the battery module according to an example embodiment may be disposed by stacking a pouch-type secondary battery cells C accommodating the electrode assembly by three-surface sealing the same or a can-type secondary battery cells C accommodating the electrode assembly by one-surface sealing the same.

According to the above, a sealing portion E of the cell body member, formed by sealing the electrode assembly of the secondary battery cells C is not formed in the bottom portion B of the secondary battery cells C, and accordingly, the bottom portion B in contact with the middle plate member 13 transfers the heat H generated by the secondary battery cells C to the middle plate member 13.

Such a pouch-type or can-type secondary battery cells C is, however, merely an example of the secondary battery cells C accommodated in the battery module of the present disclosure, and the secondary battery cells C accommodated in the battery module is not limited thereto.

The cover unit 20, in cooperation with the cell accommodating unit 10, serves to protect the secondary battery cells C accommodated in the cell accommodating unit 10.

To this end, the cover unit 20 is disposed to cover an opening of the cell accommodating unit 10, an entrance through which the secondary battery cells C is accommodated, and thus covers the secondary battery cells C in cooperation with the cell accommodating unit 10. Specifically, the cover unit 20 may include a side cover member 20 surrounding a side surface portion of the cell accommodating unit 10 and an end cover member 21 surrounding front and rear portions of the cell accommodating unit 10.

That is, the cover unit 20 may include the end cover member 21 bonded to both end portions of the middle plate member 13, and the side cover member 22 disposed to face the middle plate member 13 and bonded to the edge portions of the upper plate member 12 and the lower plate member 11.

The side heat sink 32 of the heat sink unit 30 is provided in the side cover member 22 and can thus release heat H transferred through the top portion T of the secondary battery cells C externally.

In addition, a support tab 22a for stably supporting a plurality of the secondary battery cells C stacked in a height direction of the cell accommodating unit 10 may be formed in the side cover member 22, which will be described with reference to FIG. 5 below.

Further, a substrate, and a bus bar connected to an electrode tap of the secondary battery cells C may be disposed in the end cover member 21. The configurations of the bus bar and the substrate, disposed in the end cover member 21, may be subject to a design change to correspond to a case in which the secondary battery cells C is a multitap including a cathode tap and an anode tap formed in one end portion thereof or a case in which the secondary battery cells C is a single tap including a cathode tap formed in one end portion and an anode tap formed in the other end portion.

The heat sink unit 30 receives the heat H generated by the secondary battery cells C through the cell accommodating unit 10 and the cover unit 20 to release the heat H externally.

As an example, the heat sink unit 30 may be configured to use a flowing cooling fluid to receive the heat H released from the secondary battery cells C and release the same externally. That is, when a cooling fluid having a lower temperature than the secondary battery cells C flows inside the cell accommodating unit 10 and the cover unit 20 and receives the heat H generated by the secondary battery cells C to turn into a high-temperature cooling fluid, the heat sink unit 30 allows the cooling fluid to flow out externally having a lower temperature than the secondary battery cells C and releases the heat followed by circulating the heat in the direction of the secondary battery cells C, thereby releasing the heat H of the secondary battery cells C to the outside.

However, the heat sink unit 30 is not limited to such a configuration, and any heat sink unit capable of releasing heat H transferred from the secondary battery cells C can be the heat sink unit 30 of the present disclosure.

Such a heat sink unit 30 may specifically include a center heat sink 31, a side heat sink 32, or the like, according to a dispositional location, which will be described in detail with reference to FIG. 3.

Figure 3:
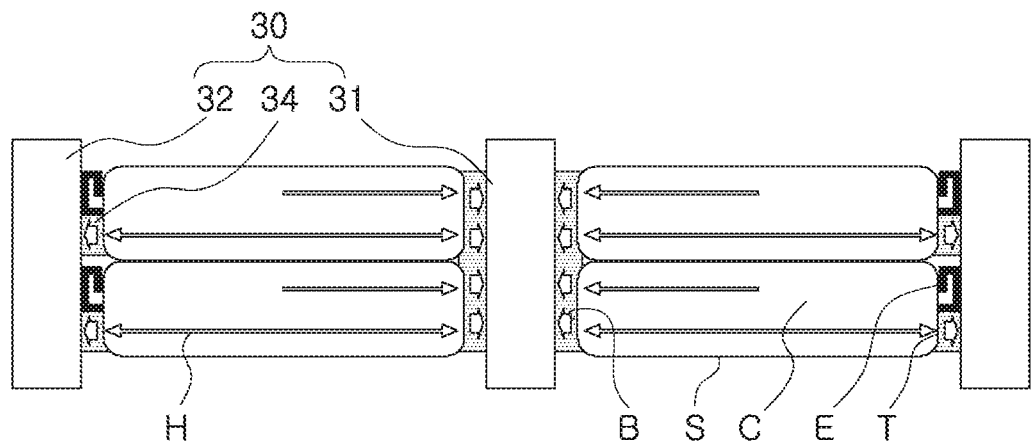
FIGS. 3 and 4 are front views of a heat sink unit in a battery module.
Figure 4:
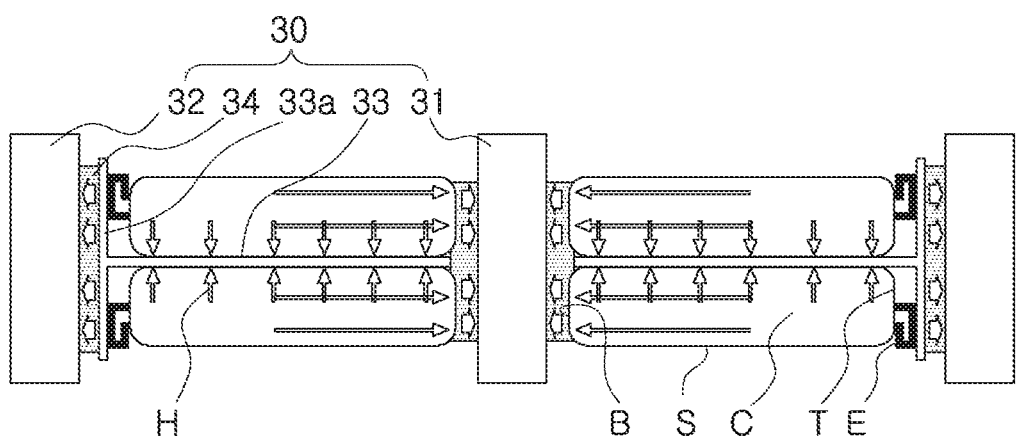

FIGS. 3 and 4 are front views illustrating only a heat sink unit 30 in the battery module of the present disclosure. FIG. 3 illustrates an example embodiment in which a side heat sink receives heat H through a thermally conductive member 34 provided in a remaining top portion T of the secondary battery cells C, excluding a portion in which a sealing portion E of the secondary battery cells C is folded, and FIG. 4 illustrates an example embodiment in which a cooling pin member 33 is provided.

Referring to FIGS. 3 and 4, the heat sink unit 30 of a battery module according to an example embodiment may include a center heat sink provided in the middle plate member 13 to release heat transferred from a bottom portion B of the secondary battery cells C.

That is, the center heat sink 31 may be provided in the middle plate member 13, in contact with the bottom portion B of the secondary battery cells C, and can thus receive the heat H from the bottom portion B of the secondary battery cells C to release the same externally.

Further, the heat sink unit 30 of the battery module may include a side heat sink 32 provided in the side cover member 22 of the cell accommodating unit 10 facing the middle plate member 13 to release heat H transferred from a top portion T of the secondary battery cells C externally.

That is, the side heat sink 32 may be provided in the side cover member 22, in contact with the top portion T of the secondary battery cells C, and can thus receive the heat from the top portion T of the secondary battery cells C to release the same to the outside.

However, as a sealing portion E is also provided in the top portion T of the secondary battery cells C, the side cover member 22 cannot be in contact with the entire top portion T of the secondary battery cells C and can be in contact with a portion of the top portion T of the secondary battery cells C, excluding a portion in which the sealing portion E is folded.

That is, the thermally conductive member 34 of the battery module according to an example embodiment may be formed in the remaining region of the top portion T of the secondary battery cells C, neighboring the region in which the sealing portion E of the secondary battery cells C, formed to protrude from the top portion T of the secondary battery cells C, is folded.

Further, as there may be a gap formed between the top portion T of the secondary battery cells C by the sealing portion E, the thermally conductive member 34 may serve as a mediator for filling the gap.

That is, the heat sink unit 30 of the battery module according to an example embodiment may include a thermally conductive member 34 disposed between the middle plate member 13, in which the center heat sink 31 is disposed, and the bottom portion B of the secondary battery cells C, and between the side cover member 22, in which the side heat sink is disposed, and the top portion T of the secondary battery cells C to form a heat transfer path.

As the above, due to the thermally conductive member 34, a contact ratio between the center heat sink 31 and the middle plate member 13, and that between the side heat sink 32 and the side cover member 22 may be included.

That is, as the bottom portion B and the top portion T of the secondary battery cells C may not be flat, it may be difficult to be completely in contact with the middle plate member 13 or the side cover member 22. However, this may be improved by including the thermally conductive member 34.

The thermally conductive member 34 may increase efficiency in transferring heat generated by the secondary battery cells C to the middle plate member 13 in which the center heat sink 31 is provided, and also efficiency in transferring the heat to the side cover member 22 in which the side heat sink 32 is provided.

In this case, the thermally conductive member 34 is formed to have a shape corresponding to a shape of the bottom portion B of the secondary battery cells C to support the secondary battery cells C, which will be described in detail with reference to FIG. 5.

In addition, the heat sink unit 30 of the battery module according to an example embodiment may include a cooling pin member 33 disposed between the secondary battery cells C neighboring each other, and having an one end portion extended to be close to the middle plate member 13 and the other end portion extended to be in contact with the side cover member 22.

Due to the cooling pin member 33, the heat H generated by the secondary battery cells C may be released through a side surface portion S of the secondary battery cells C as well. This may increase cooling performance for the secondary battery cells C even higher.

That is, as the one end portion of the cooling pin member 33 is extended to be close the middle plate member 13 and the other end portion is extended to be in contact with the side cover member 22 while being disposed between the neighboring secondary battery cells C, the cooling pin member 33 is disposed to be in contact with the side surface portion S of the secondary battery cells C. In this regard, the heat H generated by the secondary battery cells C may be transferred to the side cover member 22 by such a contact with the side surface portion.

In addition, the cooling pin member 33 of the battery module according to an example embodiment may be provided with a contact plate 33a for enlarging a contact surface area with the side cover member in the other end portion thereof.

Such a contact plate 33a serves to extend a path for transferring the heat H transferred through the side surface portion S of the secondary battery cells C to the side cover member 22.

This may increase efficiency in transferring the heat H to the side cover member 22, and consequently, the cooling performance of the secondary battery cells C.

The contact pin 33a is provided to be perpendicular to the other end portion of the cooling pin member 33 and corresponds to a heat portion of a "T"-shape of the cooling pin member 33.

Figure 5:
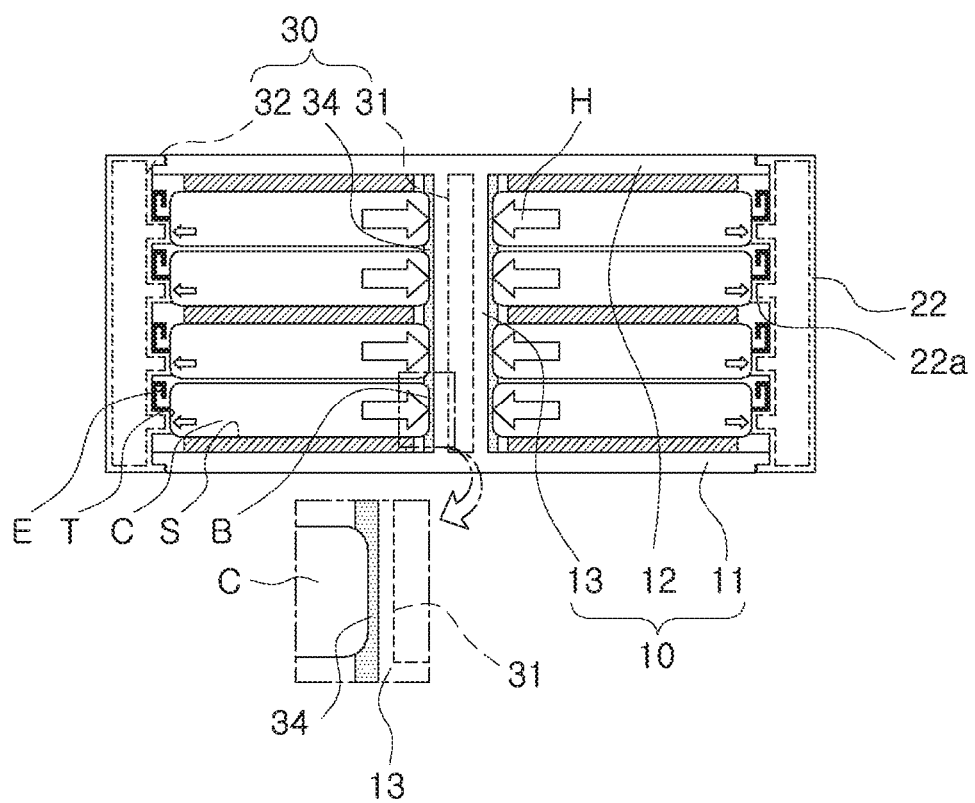
FIG. 5 is a front view of an example embodiment in which a support tab is included in a battery module.

FIG. 5 is a front view illustrating an example embodiment in which a support tab 22a is included in the battery module of the present disclosure. Referring to FIG. 5, the thermally conductive member 34 of the battery module according to an example embodiment is formed such that a portion in contact with a bottom portion B of the secondary battery cells C has a shape corresponding to the bottom portion B of the secondary battery cells C to support the secondary battery cells C.

This may enable to support a plurality of secondary battery cells C stacked in the cell accommodating unit in a procumbent state in a height direction.

That is, as the thermally conductive member 34 is formed to have a shape corresponding to the bottom portion B of the secondary battery cells C enabling the bottom portion B of the secondary battery cells C to be inserted therein, a plurality of the secondary battery cells C stacked in a procumbent state in the height direction of the cell accommodating unit 10 can be supported at a height, at which each secondary battery cell C is located.

In other words, a secondary battery cell C located in a lower portion, among a plurality of the secondary battery cells C stacked in the height direction of the cell accommodating unit 10, is pressed by a secondary battery cell C disposed in an upper portion, which may create a problem in which the secondary battery cells C may rupture. In the present disclosure, however, each secondary battery cell C is supported by the thermally conductive member 34 in terms of weight, such a problem that a secondary battery cell C positioned below to neighbor may be pressed and ruptured can be prevented.

The thermally conductive member 34 of the battery module according to an example embodiment may be formed of at least one of a silicon, polyurethane, and an epoxy material to enable the secondary battery cells C to be bonded.

That is, the thermally conductive member 34 is bonded to the middle plate member 13 and the bottom portion B of the secondary battery cells C due to adhesion therebetween, and can thus be formed of such materials to support the secondary battery cells C by the adhesion.

However, the material of the thermally conductive member 34 is not limited thereto, and any adhesive material capable of transferring heat H and adhesive can be the thermally conductive member 34 of the present disclosure.

The side heat sink 32 of the battery module according to an example embodiment may be provided to extend to a support tab 22a of the side cover member 22 formed to protrude in a direction of the secondary battery cells C so as to support each secondary battery cell C accommodated in the cell accommodating unit 10 to be stacked.

Due to the support tab 22a provided in the side cover member 22, a plurality of the secondary battery cells C stacked in the cell accommodating unit 10 in a procumbent state may be supported in a height direction.

That is, a plurality of the secondary battery cells C stacked in a height direction of the middle plate member 13 is seated on the support tab 22a neighboring a top portion T, and this enables to support a plurality of the secondary battery cells C stacked in the height direction of the cell accommodating unit 10 in a procumbent state at a height at which each secondary battery cell C is located.

In other words, a secondary battery cell C located in a lower portion, among a plurality of the secondary battery cells C stacked in the height direction of the cell accommodating unit 10, is pressed by a secondary battery cell C disposed in an upper portion, which may arise a problem that the secondary battery cells C may be ruptured. In the present disclosure, however, each secondary battery cell C is supported by the support tab 22a in terms of weight, such a problem that a secondary battery cell C positioned below to neighbor may be pressed and burst can be prevented.

Further, as the support tab 22a is extended to be closer to the top portion T of the secondary battery cells C, heat transfer efficiency can be increased even higher due to the side heat sink 32 provided to extend to the support tab 22a.

As an example, in the case in which the side heat sink 32 has a structure which circulates a cooling fluid, the cooling fluid extends to the support tab 22a to circulate and can thus be comparatively close to the top portion T of the secondary battery cells C, thereby shortening the heat transfer path. Accordingly, heat transfer efficiency through the top portion T may be increased. The support tab 22a of the battery module according to an example embodiment may be disposed to have a shape corresponding to the remaining region of the top portion T of the secondary battery cells C, neighboring a region in which the sealing portion E of the secondary battery cells C formed to protrude from the top portion E of the secondary battery cells C.

This enables to support the secondary battery cells C more closely in a height direction of the cell accommodating unit 10. In this regard, the heat transfer efficiency through the top portion T may be increased, and the secondary battery cells C can be supported more stably.

According to the aforementioned example embodiments, the battery module of the present disclosure is advantageous in that heat dissipating performance due to the heat sink unit thereof can be improved.

In another aspect, the battery module of the present disclosure is advantageous in that a degree of freedom can be secured in height direction design changes. This leads to an effect of increased efficiency in space utilization when installing a secondary battery cell.

The battery module of the present disclosure is advantageous in that rigidity can be reinforced by a structure thereof without any additional configuration. This leads to an effect of securing durability while reducing an overall weight thereof.

Various advantages and beneficial effects of the present disclosure are not limited to the above descriptions and may be easily understood in the course of describing the specific embodiments of the present disclosure.

While the example embodiments have been shown and described above, it will be apparent to those skilled in the art that modifications and variations could be made without departing from the scope of the present invention as defined by the appended claims.

What is claimed is:

1. A battery module, comprising:
   a plurality of secondary battery cells;
   a cell accommodating unit equipped with at least one of the secondary battery cells in a procumbent state;

a cover unit coupled to the cell accommodating unit and covering an opening of the cell accommodating unit for accommodating the secondary battery cells; and a heat sink unit provided in the cell accommodating unit and the cover unit and in contact with a bottom portion and a top portion of the secondary battery cells to externally release heat generated by the secondary battery cells, wherein the cell accommodating unit comprises:

a lower plate member in which secondary battery cells are seated and in contact with a side surface portion of a lowermost secondary battery cell;

an upper plate member disposed to face the lower plate member; and a middle plate member coupled to connect the lower plate member and the upper plate member and in contact with the bottom portion of the secondary battery cells;

wherein the middle plate member is bonded to a central portion of the upper plate member and a central portion of the lower plate member separating the cell accommodating unit into two accommodating sub-units, each accommodating a different stack of secondary battery cells, wherein both sides of the middle plate member contact the bottom portion of the secondary battery cells, wherein the cover unit includes a side cover member disposed to face the middle plate member and coupled to corner portions of the upper plate member and the lower plate member, wherein the side cover member includes a support tab protruding into the remaining area of the top of the secondary battery cell adjacent to the area in which the sealing portion of the secondary battery cell is folded and disposed, wherein the heat sink unit comprises a center heat sink provided in the middle plate member and releasing heat generated by the bottom portion of the secondary battery cells externally and a side heat sink provided in the side cover member and releasing heat generated by the top portion of the secondary battery cells externally, and wherein the side heat sink is provided to extend to the support tab.

2. The battery module of claim 1, wherein the heat sink unit comprises a thermally conductive member disposed between the bottom portion of the secondary battery cells and the middle plate member disposed with the center heat sink, and forming a heat transfer path.

3. The battery module of claim 2, wherein the thermally conductive member has a portion in contact with the bottom portion of the secondary battery cells, formed to have a shape corresponding to a shape of the bottom portion of the secondary battery cells to support the secondary battery cells.

4. The battery module of claim 2, wherein the thermally conductive member is formed of at least one of silicon, polyurethane and an epoxy material such that the secondary battery cells is bonded thereto.

5. The battery module of claim 1, wherein the support tab is formed in the top portion of the secondary battery cells where the sealing portion is not located.

6. The battery module of claim 1, wherein the cell accommodating unit is disposed by stacking a pouch-type secondary battery cells three-surface-sealing and accommodating an electrode assembly.

* * * * *